Dec. 25, 1962 H. W. FAEBER 3,070,066
COATING APPARATUS HAVING BLADE CONTROL
MEANS AND RELEASABLE BLADE HOLDER
Filed Aug. 6, 1957 5 Sheets-Sheet 1

INVENTOR.
Harry W. Faeber
BY
Brumbaugh, Free, Graves & Donohue
ATTORNEYS

Dec. 25, 1962 H. W. FAEBER 3,070,066
COATING APPARATUS HAVING BLADE CONTROL
MEANS AND RELEASABLE BLADE HOLDER
Filed Aug. 6, 1957 5 Sheets-Sheet 2

INVENTOR.
Harry W. Faeber
BY
ATTORNEYS

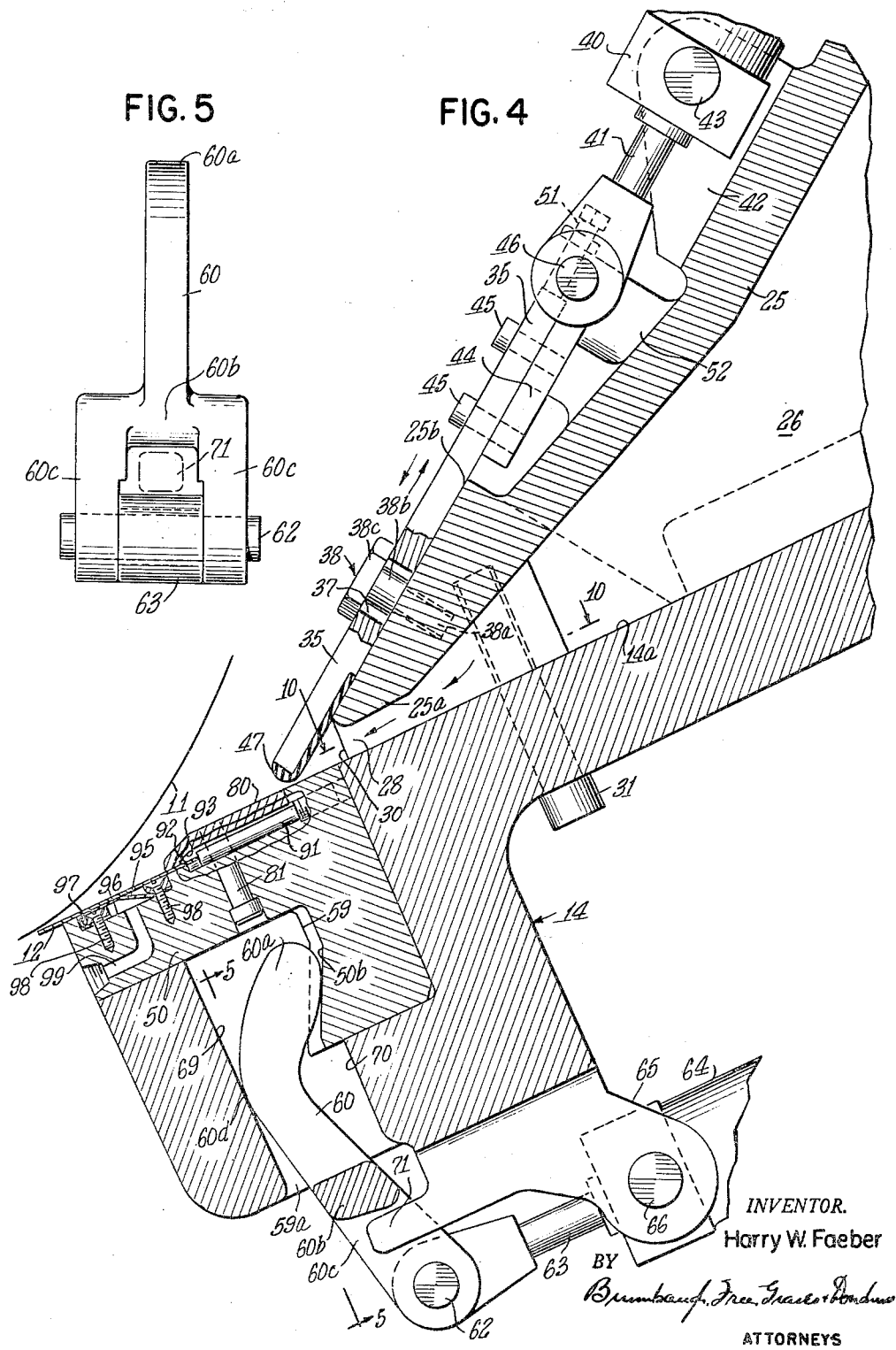

INVENTOR.
Harry W. Faeber

Dec. 25, 1962 H. W. FAEBER 3,070,066
COATING APPARATUS HAVING BLADE CONTROL
MEANS AND RELEASABLE BLADE HOLDER
Filed Aug. 6, 1957 5 Sheets-Sheet 5

INVENTOR.
Harry W. Faeber
BY
ATTORNEYS

United States Patent Office 3,070,066
Patented Dec. 25, 1962

3,070,066
COATING APPARATUS HAVING BLADE CONTROL MEANS AND RELEASABLE BLADE HOLDER
Harry W. Faeber, Larchmont, N.Y., assignor to Time, Incorporated, New York, N.Y., a corporation of New York
Filed Aug. 6, 1957, Ser. No. 676,553
7 Claims. (Cl. 118—413)

This invention relates to improvements in web coating apparatus.

In many types of conventional web coating apparatus, the coating material is stored in a reservoir and fed by means of one or more rollers onto the surface of the web to be coated. Thereafter, the coated surface of the web is acted upon by a relatively thin, flexible blade, referred to in the art as a "doctor" blade, which smooths out and spreads the coating more evenly upon the surface. If an excessive quantity of coating material is applied to the surface of the web, the coating material will accumulate on the doctor blade and, unless provision is made for regulating the quantity of coating material applied to the web, the machine will ultimately have to be shut down to permit the excess accumulated coating material to be removed from the doctor blade.

In addition, conventional web coating apparatus must be shut down at regular intervals as a matter of course to permit adjustment, cleaning or replacement of the doctor blade. The adjustment and proper positioning of the doctor blade relative to the surface of the web is critical to the successful web coating operation. Due to the fact that the blade is in constant engagement with the surface of the web during the coating operation, and therefore subjected to constant wear, it is necessary to make adjustments of the blade from time to time. In addition, from time to time it becomes necessary to remove the blade for cleaning or, if damaged or subjected to excessive or uneven wear, for replacement. In many types of web coating apparatus, the blade is supported in a manner which makes it difficult to adjust or remove the blade, with the result that the period of shutdown for these purposes is altogether excessive.

In the web coating apparatus of the present invention, the coating material is initially applied to the surface of the web and spread out evenly thereon by the same blade, thus obviating the need for a system of rollers for feeding coating material onto the surface of the web. The blade is supported on a frame or platform which is adjustable relatively to a web engaging backup cylinder. In one position of adjustment of the frame, the blade is held in proximity to the web engaging backup cylinder so as to engage the outer surface of a web passing between the blade and the outer periphery of the cylinder. In another position of adjustment of the frame, the blade is spaced apart from the backup cylinder.

The adjustable frame or platform carries a reservoir for the coating material, from which the coating material is fed to the upper surface of the blade. The coating material is discharged through an elongated or widemouthed port at the forward end of the reservoir, and the coating material leaving the discharge port flows toward and onto the upper surface of the blade which, in turn, applies it to the surface of the web.

In addition to the simplification of the apparatus occasioned by the utilization of a single blade both to apply the coating material to the web and to spread it evenly thereon, the apparatus of the present invention has the advantage that both the blade and the reservoir are readily accessible for servicing, cleaning, etc., when the adjustable frame or platform is moved to retracted or inoperative position.

One important feature of the web coating apparatus of the present invention is the novel means employed for regulating the flow of the coating material from the reservoir to the blade. This regulation is made possible by a metering gate which is stationed at the discharge port of the reservoir. The adjustment of this metering gate is capable of regulating the flow of the fluid over a fairly wide range, or even of cutting off the flow entirely, if desired.

Another important feature of the web coating apparatus of the present invention is in the means for mounting the blade to the adjustable frame or platform to facilitate adjustment of the blade or removal of the blade for cleaning or replacement. In the present invention, the blade is clamped to a bar which is detachably mounted from the adjustable frame. The back end of the blade is clamped to this detachable bar across the entire longitudinal length of the blade to eliminate any curvatures or buckles in the blade. In addition, the opposite ends of the blade are capable of being locked to clamps which are adjustable laterally of the machine, or, in other words, longitudinally of the blade so that the blade can be placed under longitudinal tension while in use. The forward edge of the blade is left relatively free to permit the forward edge to be pressure urged against the web across the entire length of the blade. Since the blade may be clamped to the bar before the bar is mounted to the frame, it is possible to accurately position and adjust the blade before the bar is mounted in place.

Still another feature of the apparatus of the present invention is the means for locking the blade supporting bar to the adjustable frame or platform and for releasing the bar when it is desired to detach the bar from the apparatus.

These and other features of the invention will be more fully understood by reference to the detailed description which follows and to the accompanying drawings in which:

FIGURE 4 is a cross-sectional side elevation view, taken substantially along the plane 4—4 of FIGURE 8, looking in the direction of the arrows;

FIGURE 5 is a view taken generally along the plane 5—5 of FIGURE 4, looking in the direction of the arrows;

Figure 1:
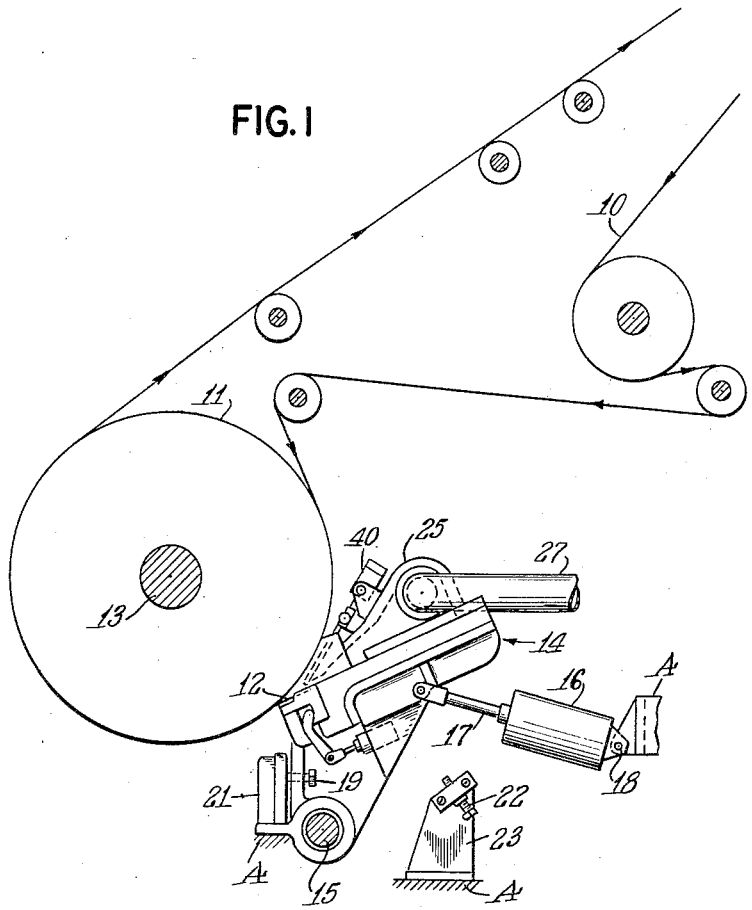
FIGURE 1 is a side elevation view of the web coating apparatus of the present invention.

Referring to FIGURE 1 of the drawings, the web 10 to be coated in fed via a series of guide rolls to a rotatable backup cylinder 11 supported on a transverse shaft 13, and as the web passes around the outer circumference of the backup cylinder 11, the coating material is applied to and spread evenly on the outer surface thereof by a blade 12 made of resilient steel. Thereafter, the coated web is guided by a series of rollers for further processing or for winding upon a storage roll (not shown).

The web coating blade 12 is supported by a pivotal frame 14, and the frame 14 is pivotally mounted to the main frame A of the machine on a transverse shaft 15. The pivotally mounted frame 14 is shown in its operative position in FIGURES 1 and 2, and in its inoperative or retracted position in FIGURE 3. The movement of the frame from one position to another is controlled by the actuation of a piston which is movable within a pneumatic cylinder 16. A piston rod 17 is connected to the piston, and the forward end of the piston rod 17 is pivotally connected to the frame 14. The pneumatic cylinder, in turn, is pivotally connected at 18 to the main machine frame A. When in the operative position shown in FIGURES 1 and 2, the resilient blade 12 is held in contact with the outer surface of the web across the entire forward edge or tip of the blade, with the upper surface of the blade forming an acute angle with the web and outer periphery of the cylinder.

Figure 3:
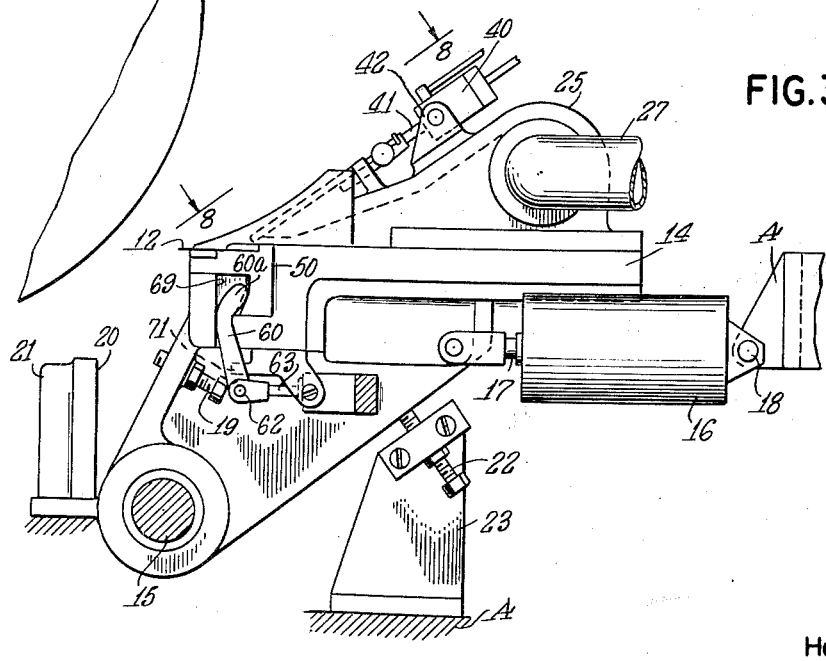
FIGURE 3 is a side elevation view of the apparatus shown in FIGURE 2, showing the frame or platform in retracted or inoperative position.

To facilitate proper adjustment of the blade and to insure that the blade makes proper contact with the surface of the web to be coated, a plurality of adjustable set screws 19 (only one of which is shown) are carried by the frame, and the engagement of these screws with the face 20 of a fixed stop or bumper member 21 determines the operative position of the frame. Similarly, one or more upwardly inclined set screws 22 are supported by an upstanding bracket member 23 affixed at its base to the main frame A of the machine. The set screw 22, as best shown in FIGURE 3, determines the retracted position of the pivotal frame 14. It may be noted that in the retracted position of the main frame, the blade is tilted back to, or perhaps slightly beyond, the horizontal plane, so that any coating material on the upper surface of the blade will not fall or drip therefrom onto the machine proper.

Figure 10:
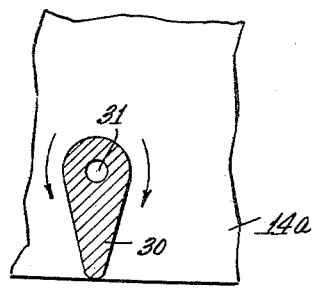
FIGURE 10 is a fragmentary cross-section view, taken along the plane 10—10 of FIGURE 4, looking in the direction of the arrows.

A hollow housing 25 is mounted upon the upper platform surface 14a of the pivotal frame behind the web coating blade 12. A chamber 26 is defined within the housing 25, and this chamber serves as an enclosed reservoir for the coating material which is supplied to the enclosed reservoir 26 through a conduit 27. If desired, the coating material may be force fed through the conduit 27 or fed by gravity. As best shown in FIGURE 4, the forward end of the reservoir 26 is provided with a wide-mouthed restricted passage 28, which passage is defined between the upper surface 14a of the frame 14 and the surface 25a of the housing 25. The restricted port or passage 28 extends transversely of the apparatus so that its width is approximately equal to the width of the web to be coated. As shown in FIGURES 4 and 10, a plurality of vertically disposed, streamlined supporting ribs 30 are interposed within the discharge port or passage 28 at spaced apart intervals. These ribs are tapered in a forward direction, so that a substantially uniform flow of coating material is obtained downstream of the ribs across the entire width of the discharge port or passage. Screws 31 threaded through aligned holes in the frame 14, the rib 30 and the housing 25 serve to anchor the rib in place.

Figure 2:
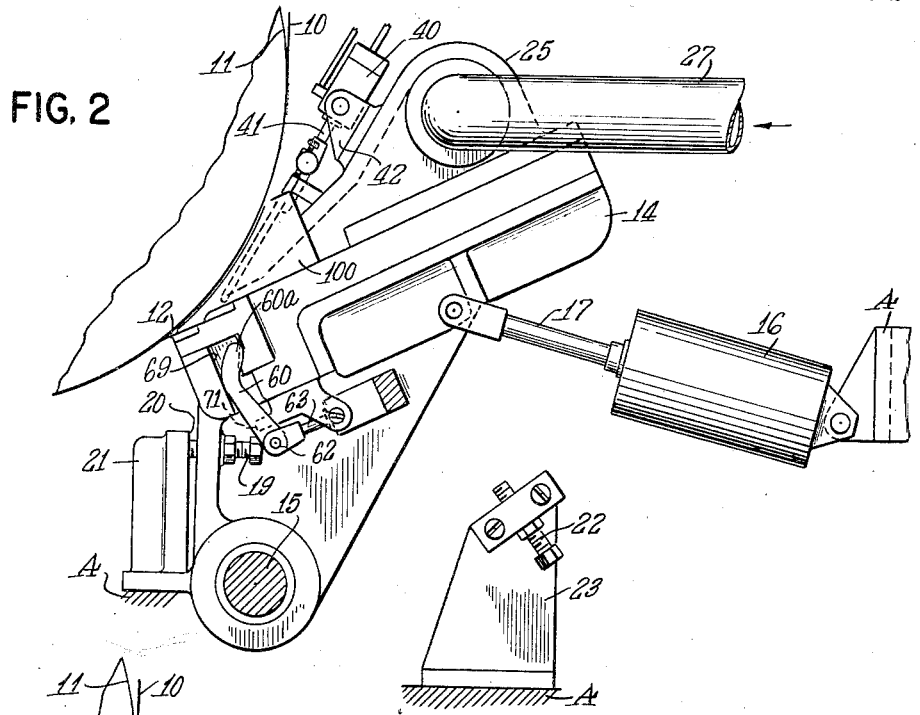
FIGURE 2 is an enlarged side elevation view of certain of the apparatus shown in FIGURE 1.

As shown in FIGURES 1, 2 and 4, when the frame 14 is moved to operative position, the surface 14a slopes downwardly, permitting the coating material to flow by gravity through the discharge passage 28 of the reservoir toward the upper surface of the blade 12. The rate of flow of the coating material is controlled by the setting of an adjustable metering gate 35 which is slidably mounted to the inclined front surface 25b of the housing 25 between fixed guides 36 which engage the side edges of the gate. The gate contains a number of fore-and-aft slots 37 which receive studs 38 therein. The studs 38 comprise, as best shown in FIGURE 4, a threaded shank 38a which is screwed into a threaded hole in the surface 25b, a shoulder 38b of larger diameter than the shank 38a, and an enlarged head 38c. The length of shoulder 38b exceeds the thickness of gate 35 by a small amount, so that the studs 38 hold the gate in slidable but close surface engagement with the surface 25b.

The raising and lowering of the metering gate 35 is controlled by a piston movable within a pneumatic cylinder 40. The pneumatic cylinder 40 is mounted on pivot shafts 43 between a pair of supporting brackets 42 affixed to the housing 25. There are a number of such pneumatic cylinders 40 spaced transversely across the apparatus, all under a common control, so that they are actuated in unison. The piston rod 41 is connected to the upper end of the metering gate 35 by a coupling member 44 which is attached to the gate by screws 45 and to the piston rod by a pin 46.

In the closed position of the metering gate 35, the lower edge or tip of the gate engages the upper surface of a detachable blade holder bar 50 to which the blade 12 is clamped. A rubber strip or bumper 47 is affixed to the lower edge of the metering gate 35 to reduce the impact when the metering gate is moved to closed position by the pneumatic pistons and cylinders 40. In addition, this rubber strip extends upwardly along the underside of the gate to the surface 25b to form an effective resilient seal for the reservoir when the gate is closed. End seals 49 (see FIGURE 8) prevent escape of the coating fluid from either end of the metering gate 35.

In the raised position of the gate 35, the size of the gap or opening between the lower edge thereof and the upper surface of the bar 50 is determined by the adjustment of set screws 51 which engage the upper rear edge of the gate. Each of the adjustable set screws 51 is threadably adjusted on a boss 52 formed on the upper surface of the housing 25. There are, as mentioned above, a number of these set screws 51 spaced apart transversely across the apparatus. This gap, in turn, determines the rate of flow of the coating material from the discharge port or passage 28 to the web coating blade 12.

The bar 50 to which the resilient blade 12 is clamped is insertable endwise into a slot 59 in the forward end of the pivotal frame 14 and locked therein by several clamping fingers 60. The bar 50 is formed with a depending foot portion 50a, which the clamping fingers 60 engage, and the surface 50b of the foot portion 50a which the clamping fingers 60 engage tapers outwardly toward the bottom, so that the pressure exerted by the finger against the tapering surface tends to seat the bar in the accommodating slot 59 in the pivotal frame 14.

The upstanding finger clamps are accommodated in slots or recesses in the underside of the frame 14, which recesses are defined between the front and rear walls 69 and 70, respectively, and between the side walls 59a. The upper end 60a of each of the finger clamps is bent or crooked with respect to the lower end thereof. Moreover, the lower end thereof is bifurcated, forming a yoke 60b and a pair of depending arms 60c. The arms 60c are pivotally connected by means of a pin 62 with a movable piston rod 63 of pneumatic cylinder 64. The pneumatic cylinder 64 is supported on pivot shafts 66 between a pair of depending brackets 65 which are formed integrally with the pivotal frame 14.

Figure 6:
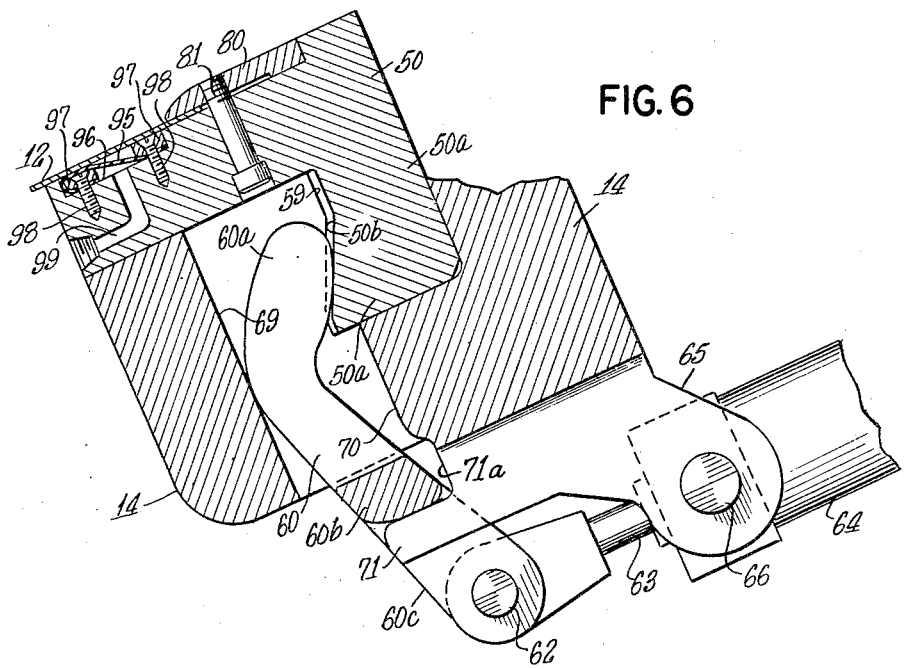
FIGURES 6 and 7 are cross-sectional side elevation views illustrating the operation of the means for locking the blade supporting bar to the adjustable frame or platform.
Figure 7:
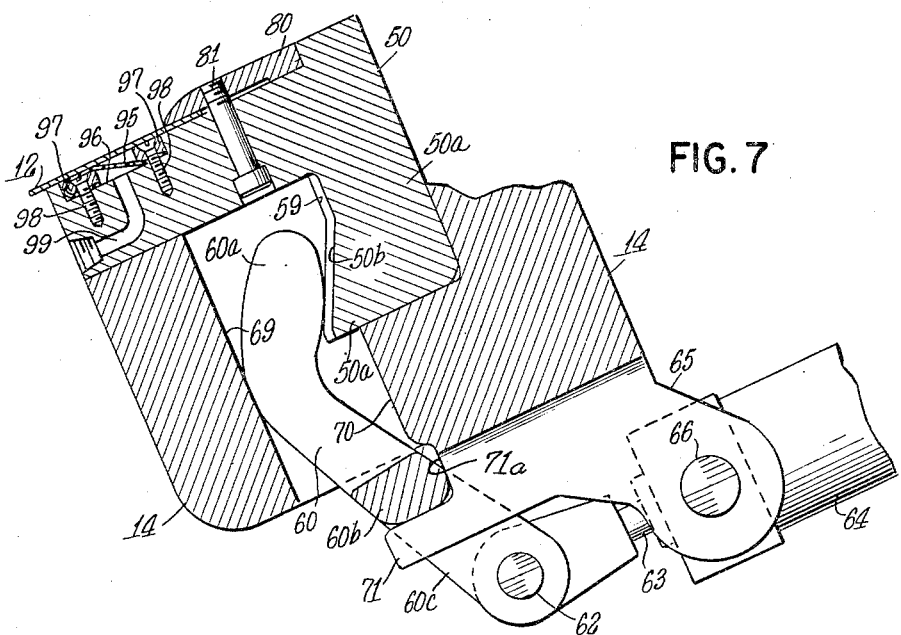

The operation of the piston and piston rod 63 associated with the pneumatic cylinder 64 controls the movement of the clamping finger 60 to locking or release positions. The clamping finger 60 is shown in locking position in FIGURE 4. To effect the lock-up of the bar 50, the piston rod 63 is urged forwardly (or to the left as viewed in the drawings), pivoting and raising the clamping finger, and the rocking, sliding engagement of the convexly curved forward edge 60d of the finger against the wall 69 moves the upper end 60a of the finger against the sloped surface 50b of the bar 50. When it is desired to release or unclamp the bar 50, the piston rod is moved rearwardly (or to the right as shown in the drawings), pivoting and lowering the clamping finger until the yoke 60b engages the ledge 71 (see FIGURE 6) which is formed integrally with the frame 14, projecting forwardly beneath the yoke 60b and between the depending arms 60c. The further movement of the piston rod causes the yoke 60b to slide along the upper surface of the ledge or projection 71 until it is stopped by surface 71a, and this action imparts a rocking movement to the clamping finger 60, moving the upper end 60a of the finger out of engagement with the surface 50b. This position of the clamping finger 60 is illustrated in FIGURE 7 of the drawings. With the finger clamp in this position, the bar 50 may be removed by sliding it endwise out of the accommodating slot of the frame 14.

The web coating blade 12 being clamped to the bar 50 is removed with it, so that the blade can be readily adjusted, cleaned or replaced apart from the apparatus. When it is desired to remount the bar 50 and the blade 12 carried thereby to the pivotal frame 14, the bar is simply inserted endwise back into the accommodating slot, while the finger clamp 60 is in the position illustrated in FIGURE 7. The pneumatic piston is thereupon actuated, moving the piston rod 63 forwardly (or to the left as shown in FIGURES 4, 6 and 7), restoring the finger clamp to the position illustrated in FIGURE 4 of the drawings.

Figure 8:
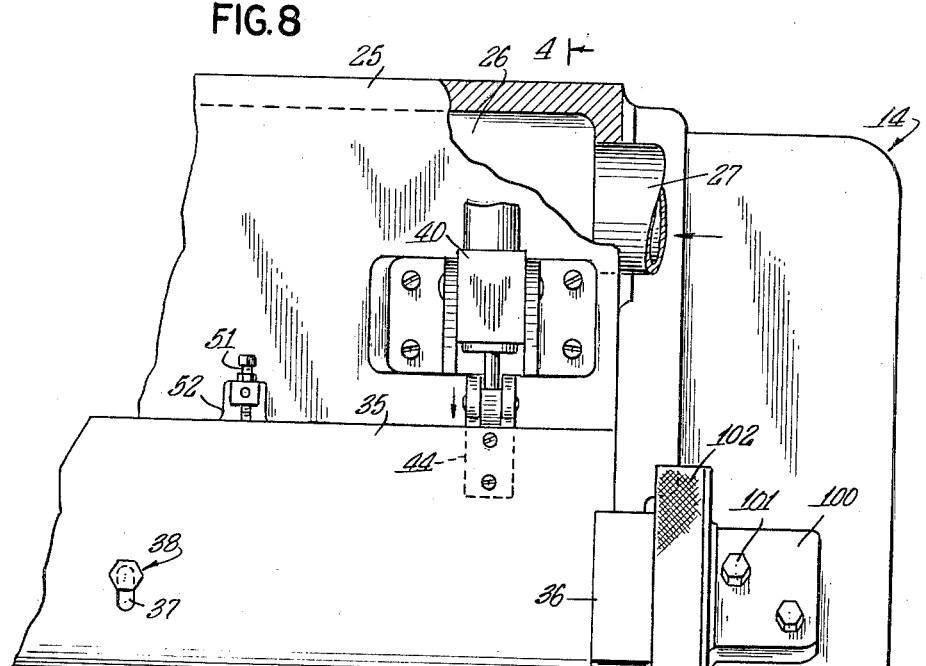
FIGURE 8 is a fragmentary transverse view of the apparatus, taken generally along the plane 8—8 of FIGURE 3, looking in the direction of the arrows.
Figure 9:
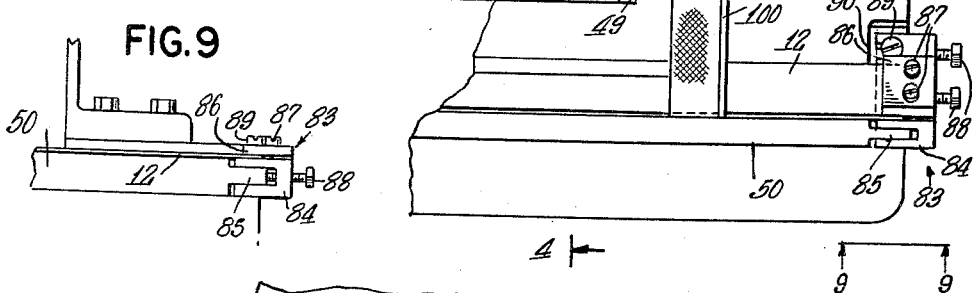
FIGURE 9 is an elevation view of the blade clamping means shown in FIGURE 8.

It is particularly important in the web coating operation that the resilient blade 12 be clamped to the bar 50 securely to insure that the forward edge of the blade is in engagement with the surface of the web across the entire width of the web. Accordingly, the blade is adapted to be clamped across its entire length by a clamping member 80 held to the bar 50 by screws 81. In addition, as best shown in FIGURES 8 and 9, the opposite ends of the blade 12 are held by clamps generally designated 83, which are capable of lateral movement relative to the ends of the bar 50, in order to permit the blade to be stressed longitudinally under tension. The clamp 83 comprises generally a U-shaped (when viewed edgewise, as in FIGURE 9) fitting 84 which is adjustably mounted on a tongue portion 85 of the movable bar 50 and a blade clamping element 86 which is held to the fitting by screws 87. The end of the blade 12 is interposed between the upper surface of the fitting 84 and the underside of the clamping element 86 before the screws 87 are tightened.

The blade 12 is placed under longitudinal tension by moving the clamps 83 laterally relative to the tongue portion 85 on which the fitting 84 is movable. The fitting 84 carries a pair of adjustable screws 88, and the ends of these screws are adapted to engage the edge of the tongue portion 85. Thus, by tightening the screws 88, the clamp 83 is moved laterally outwardly of the bar 50, placing the blade under longitudinal tension. When the clamp 83 has been backed off sufficiently, it is locked in that position by tightening a screw 89 which is threaded to the bar 50, passing through an open slot 90 in the fitting 84. When the screw 89 is loosened, the slot 90 permits the clamp 83 to be moved laterally relative to the end of the bar 50. However, when the screw 89 is tightened, the enlarged head thereof engages the upper surface of the fitting 84 and locks it relative to the bar 50.

As best shown in FIGURE 4, the rear edge of the resilient blade 12 is in registered contact with a number of blade adjusting screws 91. The screws 91 are received in threaded bores 92 at the back of the bar 50. These threaded bores 92 are open at the top to permit the upper periphery of the screws 91 to extend slightly above the plane of the blade 12, and the undersides of the longitudinal clamp 80 contain recesses or grooves 93 which accommodate the exposed periphery of the screw 91.

In clamping the resilient blade 12 to the detachable bar 50 by means of the longitudinal clamp 80 and the end clamps 83, it may be noted that the front portion of the clamp is free to permit the deflection thereof by a rubber tube or diaphragm 95 accommodated within a longitudinal slot or recess 96 formed in the upper surface of the detachable bar. The diaphragm 95 is affixed to the four legs of a rectangular frame 97, and the rectangular frame is anchored to the base of the slot 96 by screws 98. The rear end of the rubber diaphragm 95 is interposed between the base of the slot 96 and the rear leg of the rectangular frame 97. The front end of the diaphragm loops around the upper surface of the front leg of the frame, with the extreme end thereof being interposed between the base of the slot and the front leg. The side edges of the diaphragm, although not shown, are looped in similar fashion around the side legs of the rectangular frame.

A passage 99 is formed in the front of the bar 50. One end of the passage 99 communicates with the underside of the flexible diaphragm 95, and the other end is in communication with a supply of air or other fluid under pressure. During the coating operation, the pressure of the fluid beneath the diaphragm 95 urges and tends to deflect the forward end of the blade 12 into pressure contact with the surface of the web to be coated, thereby holding the front edge of the blade in wiping contact with the web.

In operation, the pivotal frame 14 is disposed in an inclined position, as shown in FIGURES 1, 2 and 4, permitting the coating material to flow by gravity or under pressure from the reservoir 26, through the discharge port or opening 28 therein, and ultimately onto the upper face of the resilient blade 12. Any outward spray of the coating material beyond the ends of the cylinder 11 is prevented by the side frames 100 which, as best shown in FIGURE 8, are held by bolts 101 to the frame 14. The inner surfaces of the side frames are provided with felt linings 102 which absorb any of the coating material received thereby to prevent the coating material from dripping onto the machine proper.

The forward edge of the resilient blade, being pressure urged against the surface of the web to be coated, not only applies the coating material to the web but spreads it out and smoothes it evenly thereon in a thin film or layer, as desired. The rate of flow of the coating material to the web coating blade is regulated by the adjustment of the metering gate 35, so as to prevent too much or too little of the coating material from being fed to the blade.

When it is desired to interrupt the web coating operation, the pneumatic piston and cylinder units 40 may be actuated to close the gate 35. The closing of the gate stops the flow of coating material to the blade. Thereupon, the piston and cylinder unit 17 may be actuated to pivot the entire assembly to the retracted or inoperative position shown in FIGURE 3 of the drawings, in which position the blade is out of contact with the web. In this position of the pivotal frame 14, the detachable bar 50 to which the blade is clamped can be readily removed by the actuation of the piston and cylinder unit 64. The actuating of this unit releases the clamping fingers 60 which normally lock the detachable bar in place. With the bar removed, the blade 12 can be conveniently adjusted, cleaned or replaced apart from the apparatus.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

I claim:

1. In a web coating machine, apparatus for mounting a web coating blade to a frame comprising a blade supporting member accommodated by said frame, a clamping member, one portion thereof being engageable with said frame and another portion thereof being engageable with said blade supporting member, and actuating means pivotally connected to said clamping member at a point remote from the portion thereof which is engageable with the blade supporting member, said actuating means imparting translatory movement to the clamping member so that the engagement of the clamping member with the frame imparts rocking movement to the clamping member, moving it into locking engagement with the blade supporting member.

2. The apparatus set forth in claim 1 including means engageable with said clamping member during the release operation thereof to impart rocking movement to the clamping member, thereby insuring the disengagement of the clamping member from the blade supporting member.

3. Web coating mechanism comprising a web engaging cylinder, a frame movable toward and away from the outer periphery of said cylinder, a web coating blade carried by said frame, a blade supporting member accommodated by said frame, means for affixing said blade to said blade supporting member, a pivotal clamping member engageable with said frame and movable bodily relative to the frame for locking the blade supporting member to the frame, and means for imparting both bodily translation and pivotal rotation to the clamping member to lock the blade supporting member to the frame or to release it for removal therefrom.

4. In a web coating machine, apparatus for mounting a web coating blade to a frame comprising a blade supporting member accommodated by said frame, a clamping member, a fixed surface adjacent said clamping member, and actuating means for said clamping member, one end of said clamping member being engageable with said blade supporting member, the opposite end being connected to said actuating means and an intermediate portion thereof being engageable with said fixed surface, said actuating means imparting translatory movement to the clamping member so that the engagement of the clamping member with the fixed surface imparts rocking movement to the clamping member, moving it into locking engagement with the blade supporting member.

5. Web coating mechanism comprising a web engaging cylinder, a frame movable toward and away from the outer periphery of the cylinder, a web coating blade carried by said frame, a blade supporting member accommodated by said frame, a slot formed in said frame for receiving the blade supporting member, a foot portion depending from said blade supporting member, an upstanding clamping finger accommodated adjacent a surface of said frame, a convexly curved edge of said clamping finger being engageable with said surface, means connected to said clamping finger for imparting both translatory and pivotal movement to the clamping finger, whereby the rocking engagement of the convex edge against said surface of the frame moves the clamping finger into and out of locking engagement with said blade supporting member.

6. In a web coating machine, the apparatus comprising a web engaging cylinder, a pivotal frame, a blade supported by said pivotal frame, a blade supporting member, means for anchoring the blade to the blade supporting member, a slot in said pivotal frame for accommodating the blade supporting member, a clamping member engageable with said blade supporting member to lock the latter to the pivotal frame, guide means engageable with the clamping member to guide it into locking engagement with the blade supporting member, a reciprocatable actuator, one end of said clamping member being movable into engagement and out of engagement with said blade supporting member and the other end of said clamping member being connected to said reciprocatable actuator, whereby during a stroke of the actuator in one direction both translatory and rocking motions are imparted to the clamping member, moving the end thereof into locking engagement with the blade supporting member, and means engageable with the clamping member during the stroke of the actuator in the opposite direction for rocking said clamping member out of engagement with the blade supporting member.

7. Apparatus as set forth in claim 6 wherein the blade supporting member is removable endwise from the slot in which it is accommodated in the pivotal frame.

References Cited in the file of this patent

UNITED STATES PATENTS

| | | |
|---|---|---|
| 1,566,358 | White | Dec. 22, 1925 |
| 1,594,284 | Vickery | July 27, 1926 |
| 1,993,055 | Gerstenberg | Mar. 5, 1935 |
| 2,273,021 | Cox | Feb. 17, 1942 |
| 2,295,394 | Fordyce et al. | Sept. 18, 1942 |
| 2,417,796 | Happ | Mar. 18, 1947 |